(12) United States Patent
Nishimura (10) Patent No.: US 9,015,359 B2
(45) Date of Patent: Apr. 21, 2015

(54) ELECTRONIC DEVICE AND COMMUNICATION METHOD FOR CONTROLLING EXECUTION OF DEMONSTRATION DATA ON A DISPLAY SCREEN

(71) Applicant: Kabushiki Kaisha Toshiba, Tokyo (JP)

(72) Inventor: Hayato Nishimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/928,095

(22) Filed: Jun. 26, 2013

(65) Prior Publication Data

US 2015/0003807 A1    Jan. 1, 2015

(51) Int. Cl.
*G06F 3/00* (2006.01)
*G06F 13/28* (2006.01)
*H04N 5/44* (2011.01)
*G11B 27/00* (2006.01)
*H04N 9/87* (2006.01)

(52) U.S. Cl.
CPC ............ *H04N 5/4403* (2013.01); *G11B 27/005* (2013.01); *H04N 9/87* (2013.01)

(58) Field of Classification Search
None
See application file for complete search history.

(56) References Cited

U.S. PATENT DOCUMENTS

| 7,710,349 B2 | 5/2010 | De Leon |
| 8,471,912 B2 | 6/2013 | Yoneyama et al. |
| 2004/0130564 A1* | 7/2004 | Smith ............................ 345/705 |
| 2007/0115346 A1 | 5/2007 | Kim et al. |
| 2007/0201373 A1* | 8/2007 | Williams ....................... 370/241 |
| 2010/0225816 A1* | 9/2010 | Kimura ......................... 348/569 |
| 2011/0141293 A1 | 6/2011 | Yoneyama et al. |
| 2014/0026068 A1 | 1/2014 | Park et al. |

FOREIGN PATENT DOCUMENTS

| JP | 2007-081600 | 3/2007 |
| JP | 2011-147118 | 7/2011 |

OTHER PUBLICATIONS

U.S. App. No. 13/928,083, Non Final Office Action, mailed Jun. 12, 2014.
U.S. Appl. No. 13/928,083, Final Office Action, mailed Jan. 26, 2015.

\* cited by examiner

*Primary Examiner* — Idriss N Alrobaye
*Assistant Examiner* — David Martinez
(74) *Attorney, Agent, or Firm* — Blakely, Sokoloff, Taylor & Zafman LLP (57) ABSTRACT

According to one embodiment, an electronic device includes an execution module, and an execution controller. The execution controller is configured to, when a key operation is entered while demonstration data is being executed, move an execution position in the demonstration data in units of blocks correspondingly to the key operation. The executing module is configured to start the execution of the demonstration data from the moved execution position.

12 Claims, 9 Drawing Sheets

[GREEN]: SKIP FORWARD
[RED]: SKIP BACKWARD  ~501

FIG.8

[RED]: START DEMONSTRATION  ~502

ELECTRONIC DEVICE AND COMMUNICATION METHOD FOR CONTROLLING EXECUTION OF DEMONSTRATION DATA ON A DISPLAY SCREEN

FIELD

Embodiments described herein relate generally to an electronic device and a controlling method.

BACKGROUND

A mainstream demonstration function provided to an electronic device such as a television used in a store or the like have conventionally performed a sequence of demonstrations fitted for the selling points of the electronic device. Such a demonstration function is performed as a sequence of demonstrations, e.g., after performing a demonstration of displaying a list of functions supported by the electronic device, a demonstration featuring a high-definition image is provided, and then a demonstration featuring a high-quality sound is performed.

However, because such a conventional technology performs demonstrations sequentially, when a sales person in a store wishes to give a particular demonstration to a user, the sales person needs to wait until the execution of the particular demonstration begins after the demonstration sequence is started. Therefore, the usability of the demonstration function provided to a conventional electronic device in stores has not been high.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Generally, according to one embodiment, an electronic device comprises an execution module, an input receiving module, an execution controller, and a display processor. The executing module is configured to execute demonstration data divided into a plurality of blocks, in units of blocks. The input receiving module is configured to receive an input of a predetermined key operation from a user. The execution controller is configured to, when the key operation is entered while the demonstration data is being executed, move an execution position in the demonstration data in units of blocks correspondingly to the key operation. The display processor is configured to display content of execution of the demonstration data on a display. The executing module is configured to start the execution of the demonstration data from the moved execution position.

First Embodiment

Figure 1:
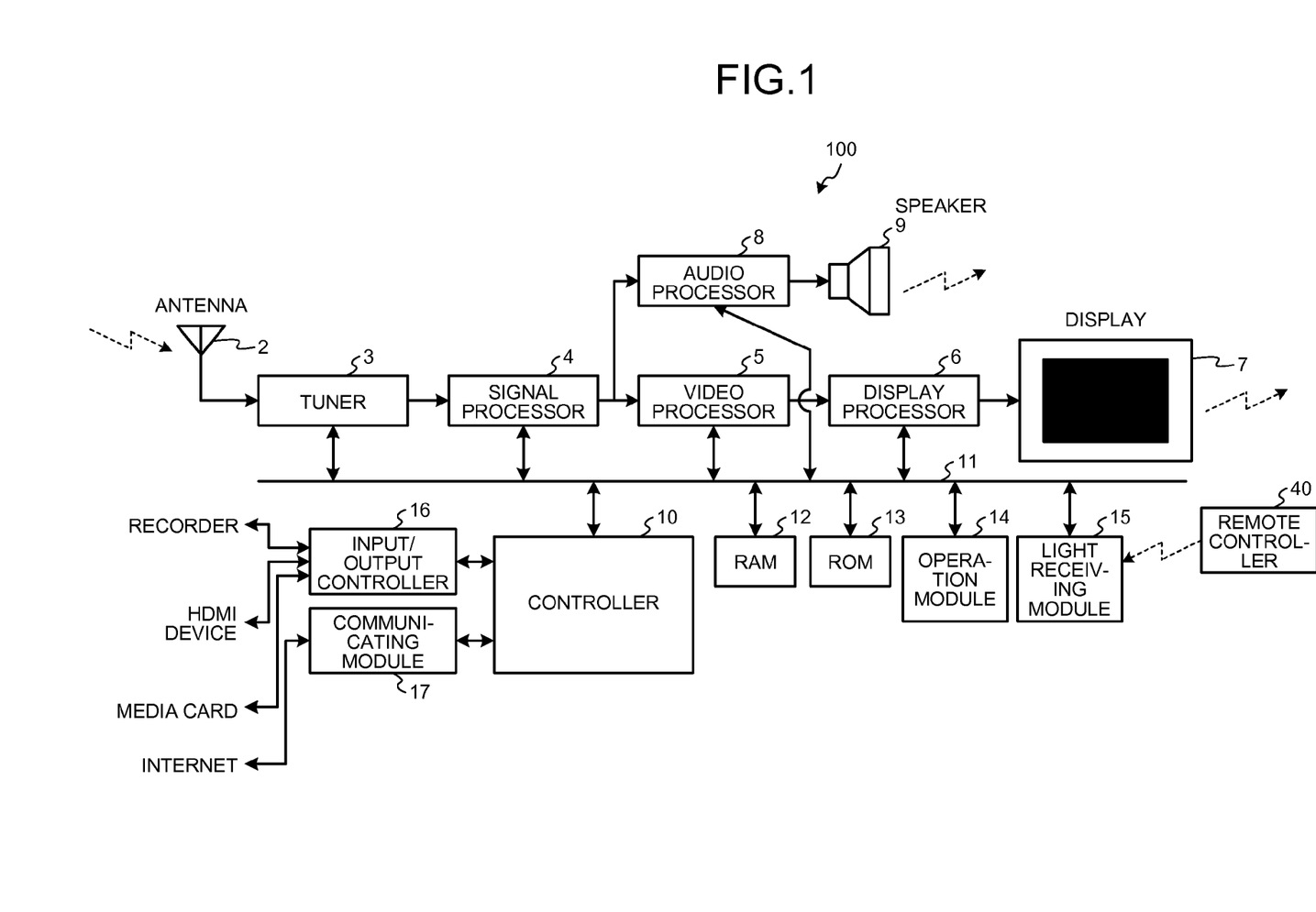
FIG. 1 is an exemplary block diagram illustrating a configuration of a digital television 100 as an electronic device according to a first embodiment.

As illustrated in FIG. 1, a digital television 100 according to a first embodiment mainly comprises an antenna 2, a tuner 3 for receiving digital broadcasting, a signal processor 4, a video processor 5, a display processor 6, a display 7, an audio processor 8, a speaker 9, a controller 10, a communication line 11, a random access memory (RAM) 12, a read only memory (ROM) 13, an operation module 14, a light receiving module 15, an input/output controller 16, and a communicating module 17.

The antenna 2 receives digital broadcasting such as BS, CS, and terrestrial broadcasting. The tuner 3 selects a channel to be watched instructed by a user. The signal processor 4 takes out and processes signals demodulated by the tuner 3, or various signals received from the input/output controller 16 as digital signals, under the control of the controller 10. The signal processor 4 also separates the input signal into a video signal and an audio signal, and outputs the video signal to the video processor 5 and outputs the audio signal to the audio processor 8.

The video processor 5 perform processes such as a process of adjusting the video signals received from the signal processor 4 to an image of a correct size, and a process of removing noise included in the video signals, as image quality processing for improving the image quality of a video.

The display processor 6 performs a process of displaying the video signals output from the video processor 5 on the display 7. The display processor 6 also superimposes on-screen display (OSD) such as character information over the video signals output from the video processor 5. The display 7 displays the video signals on the screen. The user watches the television image by looking at the screen on the display 7.

The audio processor 8 performs audio signal processing, and amplifies the audio signal. The speaker 9 outputs the audio signal as sound. The user hears the sound of the television by hearing the sound from the speaker 9.

The controller 10 controls each of the modules included in the digital television 100. The controller 10 is a processing unit capable of sequence processing. The controller 10 centrally controls the operation of the digital television 100 by loading computer programs stored in the ROM 13 onto the RAM 12, sequentially executing the computer programs, and outputting a control signal to each of the modules in the digital television 100.

The communication line 11 connects the tuner 3, the signal processor 4, the video processor 5, the display processor 6, the audio processor 8, and the controller 10 to one another, and enables data to be passed among the controller 10, the tuner 3, the signal processor 4, the video processor 5, the display processor 6, and the audio processor 8. Specifically, the communication line 11 may be an Inter-Integrated Circuit (IIC) bus, for example. The RAM 12 and the ROM 13 stores therein various types of data, and exchanges data with the controller 10.

The operation module 14 is a switch for receiving an operation instruction from a user. The light receiving module 15 receives a signal transmitted by a remote controller 40 receiving an operation instruction from a user. A user can operate the digital television 100 and each device connected to the digital television 100 by operating various buttons and keys on the remote controller 40.

The communicating module 17 has a function of communicating with a server over a network such as the Internet. The communicating module 17 requests information from the server, and receives the information transmitted from the server.

Figure 2:
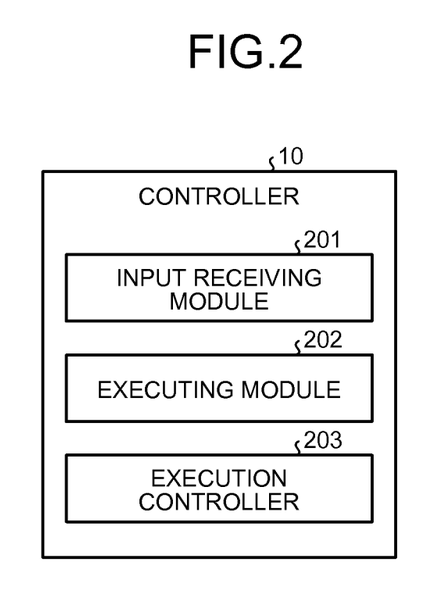
FIG. 2 is an exemplary schematic of a functional configuration of a controller in the first embodiment.

Functions executed by the controller 10 will now be explained in detail. The digital television 100 mainly comprises, as illustrated in FIG. 2, an input receiving module 201, an executing module 202, and an execution controller 203, as functional units realized by the controller 10.

The executing module 202 executes demonstration data. By executing the demonstration data, the display processor 6 is caused to display content of the data thus executed on the display 7.

Figure 3:
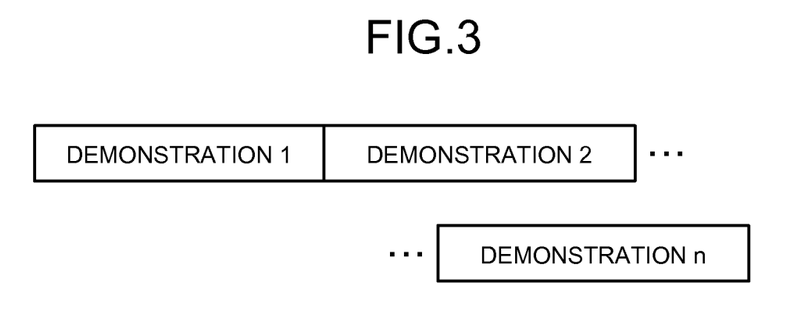
FIG. 3 is an exemplary schematic of a data structure of demonstration data in the first embodiment.

The demonstration data according to the first embodiment is divided into a plurality of blocks depending on the type of demonstration. The demonstration data according to the first embodiment comprises a block for demonstration 1, a block for demonstration 2, . . . , and a block for demonstration n, as illustrated in FIG. 3. The executing module 202 can execute the demonstration data in units of blocks. The executing module 202 can also execute a block of demonstration at an execution position determined by the execution controller 203 which will be described later.

Referring back to FIG. 2, the input receiving module 201 receives an input of a predetermined key operation performed by a user from the remote controller 40 via the light receiving module 15. An instruction for forwardly moving the execution position in the demonstration data is assigned to a green key (first key) on the remote controller 40. An instruction for backwardly moving the execution position in the demonstration data is assigned to a red key (second key). An instruction for starting executing the demonstration data when no demonstration is being executed is also assigned to the red key (third key). The input receiving module 201 receives each of these key operations performed on the remote controller 40 from a user. The display processor 6 displays an operation guide screen indicating a guide for each of the key operations on the display 7.

The instructions assigned to the respective keys are merely examples, and are not limited thereto. Furthermore, in the first embodiment, the instruction for starting executing the demonstration data when no demonstration is being executed is assigned to the red key, which is also assigned with the instruction for backwardly moving the execution position in the demonstration data. However, such an instruction may be assigned to a key other than the key assigned with the instruction for forwardly moving the execution position in the demonstration data and the key assigned with the instruction for backwardly moving an execution position in the demonstration data.

When the input receiving module 201 receives a key operation while the executing module 202 is executing the demonstration data, the execution controller 203 moves the execution position in the demonstration data in units of blocks, based on the key operation. In this manner, the execution controller is caused to execute the demonstration data from the moved execution position.

Specifically, if the input receiving module 201 receives an operation of the green key performed on the remote controller 40 while the executing module 202 is executing the demonstration data, the execution controller 203 moves the execution position in the demonstration data to the head of the block subsequent to the block currently being executed. If the input receiving module 201 receives an operation of the red key performed on the remote controller 40 while the demonstration data is being executed, the execution controller 203 moves the execution position in the demonstration data to the position of the block previous to the block currently being executed.

If the input receiving module 201 receives an operation of the red key performed on the remote controller 40 while no demonstration data is being executed, the execution controller 203 controls the executing module to cause the executing module to start executing the demonstration data. Specifically, if an operation of the red key is received after the execution of the demonstration data is completed, the execution controller 203 moves the execution position in the demonstration data to the head of the first block.

Figure 4:
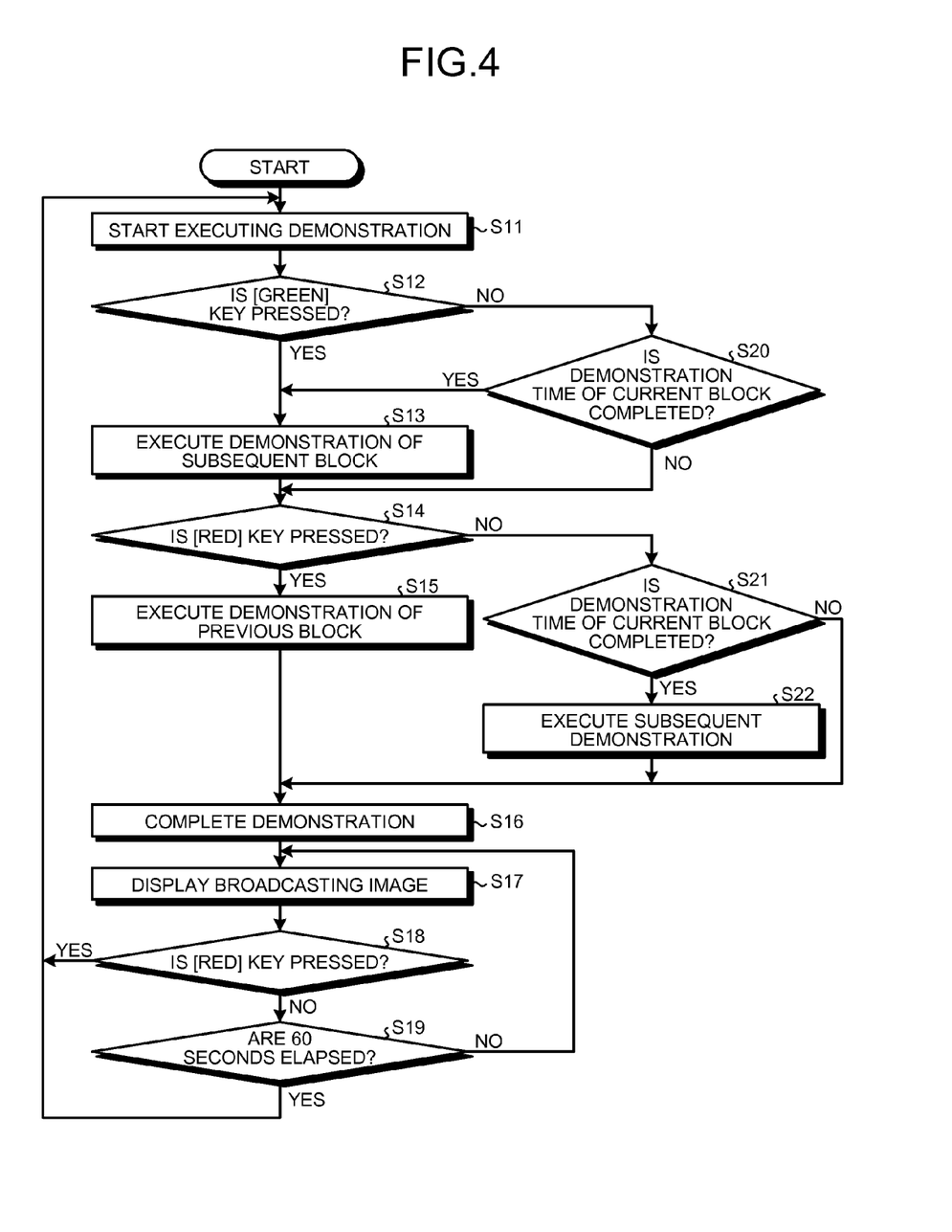
FIG. 4 is an exemplary flowchart of a demonstration execution controlling process in the first embodiment.
Figure 5A:
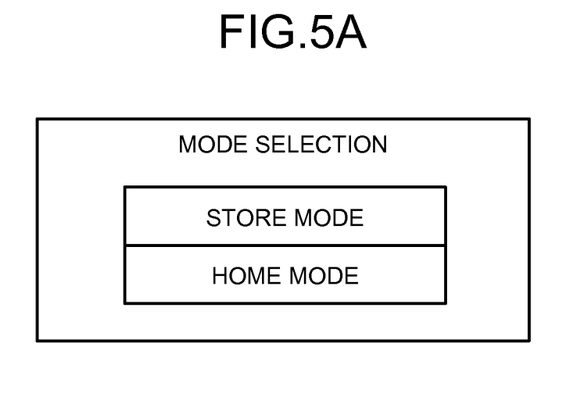
FIG. 5A is an exemplary schematic of a mode selection screen in the first embodiment.

An demonstration execution controlling process performed by the digital television 100 according to the first embodiment having the configuration described above will now be explained using FIG. 4. To begin with, the display processor 6 displays mode selection screen illustrated in FIG. 5A on the display 7. Displayed in the mode selection screen illustrated in FIG. 5A are a store mode and a home mode.

The store mode is a mode for displaying a broadcasting image on the digital television 100 in a store. In the store mode, the brightness of the display 7 is set to high, and a power saving function allowing the power to be shut down when no operation is performed over a predetermined time period is set to OFF, because the digital television 100 is displayed in the store. When the store mode is selected, demonstrations can be executed.

Figure 5B:
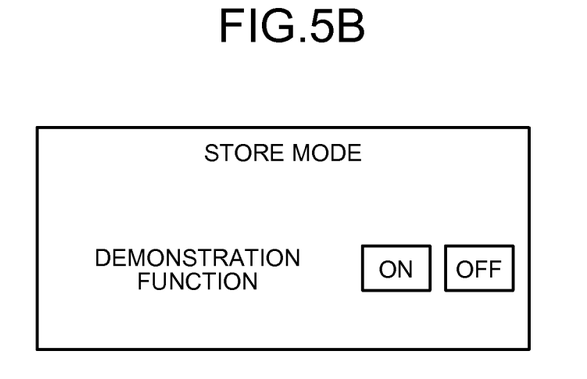
FIG. 5B is an exemplary schematic of a store mode screen in the first embodiment.

When a user selects the store mode from the mode selection screen using the operation module 14 or the remote controller 40, the input receiving module 201 receives the selection, and the display processor 6 displays the store mode screen illustrated in FIG. 5B on the display 7. As illustrated in FIG. 5B, a user is allowed to select ON or OFF for the demonstration function in the store mode screen. When a user selects ON for the demonstration function from the store mode screen using the operation module 14 or the remote controller 40, the input receiving module 201 receives the selection, and the executing module 202 starts executing the demonstration data (S11).

Figure 6:
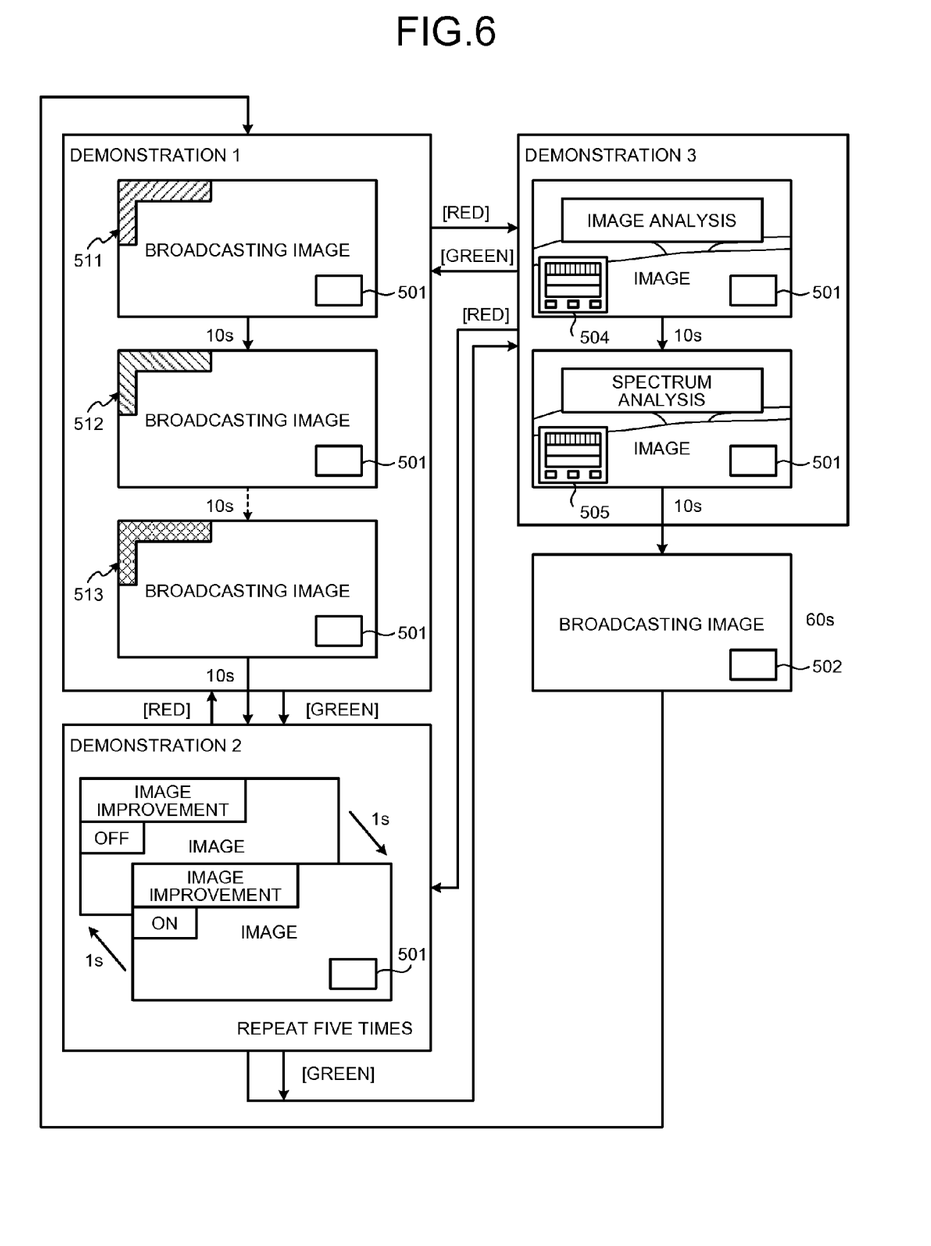
FIG. 6 is an exemplary schematic of content of demonstrations in the first embodiment.

The exemplary demonstration illustrated in FIG. 6 is divided into three blocks for demonstrations 1 to 3, and the demonstrations 1 to 3 makes up a demonstration sequence. The demonstration 1 is a demonstration for introducing functions. In the demonstration 1, pop-up windows 511 to 513 are displayed alternatingly on the display 7 at every ten seconds. As an example, the pop-up window 511 may be configured to display the logo of a particular function. The pop-up window 512 may be configured to display an overview of the particular function, and the pop-up window 513 may be configured to display the details of the particular function. However, the embodiment is not limited thereto.

The display processor 6 displays an operation guide screen 501 at the lower right end of the screen on which the pop-up windows 511 to 513 are displayed. The operation guide screen presents details of the instructions assigned to the respective keys of the remote controller 40 to a user.

Figure 7:
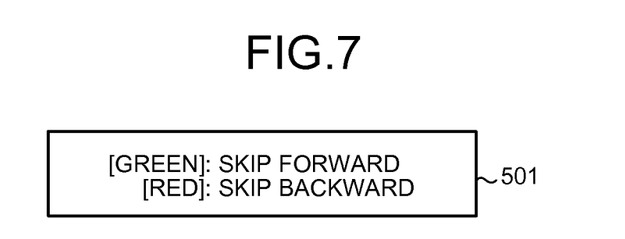
FIG. 7 is an exemplary schematic of an operation guide screen in the first embodiment.

As illustrated in FIG. 7, the operation guide screen 501 indicates that the green key is assigned with the instruction for forwardly moving the execution position, and the red key is assigned with the instruction for backwardly moving the execution position. The operation guide screen 501 illustrated in FIG. 7 is an example, and is not limited thereto.

Referring back to FIG. 6, in the screen running the demonstration 1, a broadcasting image received via the antenna 2 and the tuner 3 is displayed in the background of the pop-up window. The embodiment is not limited thereto, however, and the screen may also be configured to display an image such as a moving image or a still image stored in the digital television 100.

The demonstration 2 is a demonstration for introducing a high image quality function. The demonstration 2 displays an image applied with an image improving function (with image improvement ON) and an image not applied with the image improving function (image improvement OFF) on the display 7 alternatingly every one second, and repeats this process five times. Alternatively, a broadcasting image may be displayed instead of the image, in the manner as in the demonstration 1, and the image improvement ON and the image improvement OFF may be switched on the broadcasting image. In the demonstration 2 as well, the operation guide screen 501 illustrated in FIG. 7 is displayed at the lower right end of the screen.

The demonstration 3 is a demonstration that graphically displays a spectrum analyzer. The demonstration 3 conducts an image analysis on the image displayed on the display 7, and displays the result 504 of the image analysis (graphic) at the lower left end of the screen for 10 seconds. The demonstration 3 then conducts a spectrum analysis on the image, and the result 505 of the spectrum analysis (graphic) is displayed at the lower left end of the screen for 10 seconds.

Alternatively, a broadcasting image may be displayed instead of the image, in the manner as in the demonstration 1, and an image analysis and a spectrum analysis may be conducted on the broadcasting image, and allow the respective results 504 and 505 to be displayed. In the demonstration 3 as well, the operation guide screen 501 illustrated in FIG. 7 is displayed at the lower right end of the screen.

Referring back to FIG. 4, if the input receiving module 201 receives an input of a pressing operation on the green key performed by a user from the remote controller 40 while the demonstration data is being executed (Yes at S12), the execution controller 203 moves the execution position in the demonstration data to the head of the block subsequent to the block currently being executed. The executing module 202 then executes the demonstration at the execution position thus moved, that is, executes the subsequent block (S13). For example, if the green key is pressed down while the demonstration 2 is currently being executed, the demonstration 3, which is in the subsequent block, is executed.

At S12, if any input of a pressing operation of the green key is not received (No at S12), the executing module 202 normally continues executing the demonstration in the current block. If the demonstration time of the current block is completed (Yes at S20), the process proceeds to S13, and the executing module 202 executes the demonstration in the subsequent block (S13). If the demonstration time of the current blocks is not completed yet (No at S20), the executing module 202 continues executing the demonstration in the current block, and the process proceeds to S14.

The demonstration time herein means the execution time of a demonstration in one of the blocks. In the example illustrated in FIG. 6, the demonstration time of the demonstration 1 is 30 seconds. The demonstration time of the demonstration 2 is 10 seconds (2 seconds×5 times), and the demonstration time of the demonstration 3 is 20 seconds. In other words, completion of the demonstration time means that execution of the demonstration in corresponding one of the blocks is normally completed.

A certain time shorter than the demonstration time may be specified, and the execution controller 203 and the executing module 202 may be configured to, when the certain time elapses, forcibly end the demonstration in the current block being executed, even before completion of the execution, and to start the demonstration of the subsequent block.

If the input receiving module 201 then receives an input of a pressing operation of the red key performed by a user from the remote controller 40 (Yes at S14), the execution controller 203 moves the execution position in the demonstration data to the head of the block previous to the block currently being executed. The executing module 202 then executes the demonstration at the execution position thus moved, that is, the demonstration of the previous block (S15). For example, if the demonstration 2 is currently being executed when the red key is pressed down, the demonstration 1 which is the previous block is executed.

At S14, when any input of a pressing operation of the red key is not received (No at S14), the executing module 202 normally continues executing the demonstration in the current block. Once demonstration time in the current block is completed (Yes at S21), the executing module 202 executes the demonstration in the subsequent block (S22). If the demonstration time in the current block is not completed yet (No at S21), the executing module 202 continues executing the demonstration in the current block, and the process proceeds to S16.

When executions of the sequence of demonstration data is completed (S16), the display processor 6 displays a broadcasting image on the display 7 for 60 seconds, as illustrated in FIG. 6 (S17).

Figure 8:
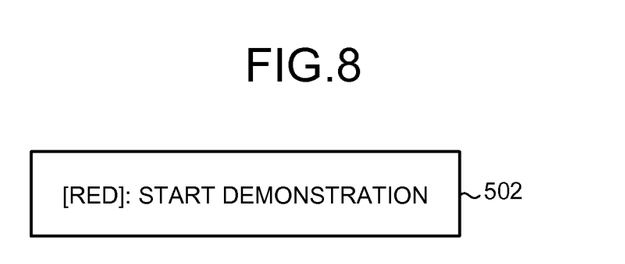
FIG. 8 is an exemplary schematic of an operation guide screen displayed on a screen after the demonstrations are completed in the first embodiment.

After the demonstrations are completed, the display processor 6 displays the operation guide screen 502 at the lower right end of the screen, as illustrated in FIG. 6. After the demonstrations are completed, the operation guide screen indicates that a pressing operation of the red key on the remote controller 40 serves as an instruction to start the demonstrations, as illustrated in FIG. 8.

Referring back to FIG. 4, if the input receiving module 201 receives an input of a pressing operation of the red key performed by a user from the remote controller 40 after the demonstration sequence is completed (Yes at S18), the execution controller 203 sets the execution position to the head of the first block, returns to S11, and causes the executing module 202 to start the demonstration data from the head, even if 60 seconds are not elapsed after the demonstrations are completed.

If the input receiving module 201 does not received a pressing operation of the red key at S18 (No at S18), the execution controller 203 determines if 60 seconds are elapsed after the demonstrations are completed (S19). If 60 seconds are elapsed (Yes at S19), the execution controller 203 sets the execution position to the head of the first block, return to S11, the executing module 202 starts the demonstration data from the head.

In this manner, according to the first embodiment, demonstration data is divided into a plurality of blocks, and a key operation performed by a user on the remote controller 40 causes the execution position of the demonstrations move to a block subsequent or previous to the block currently being executed. Therefore, in the first embodiment, because a desired function (block) can be directly caused to be executed by a key operation on the remote controller 40 even while demonstrations are sequentially being executed in a store, the number of user operations can be reduced. Furthermore, in the first embodiment, because a desired demonstration is caused to be executed via an operation performed on the remote controller 40, "skip forward" and "skip backward" can both be performed easily. Therefore, according to the first embodiment, the usability of the demonstrations in stores and the like can be improved.

Furthermore, in the first embodiment, even when a predetermined time is not elapsed after a demonstration sequence is completed, the demonstrations can be caused to start immediately by a user key operation. Therefore, the usability of the demonstration in stores and the like can be further improved.

Furthermore, in the first embodiment, because the instruction given by a key operation is described in the operation guide screen, a sales person or a user can easily understand the operation, and the usability for the users can be further improved.

Second Embodiment

In the first embodiment, a key on the remote controller 40 is assigned with an instruction for moving the execution position to the block subsequent or previous to the block a demonstration of which is currently executed. However, in the second embodiment, a different key on the remote controller 40 is assigned to each of the demonstration blocks, and the demonstration block assigned to a key that is operated by a user is caused to be executed.

The configurations of the digital television 100 and of the controller 10 according to the second embodiment are the same as those according to the first embodiment. The structure of the demonstration data according to the second embodiment is also the same as that according to the first embodiment. In the second embodiment as well, the demonstrations 1 to 3 illustrated as an example in FIG. 6 are used, but are not limited thereto.

In the second embodiment, the green key on the remote controller 40 is assigned with the execution of the demonstration 1, the red key is assigned with the execution of the demonstration 2, and the blue key is assigned with the execution of the demonstration 3. The keys and the demonstration blocks assigned to the respective keys are merely an example, and are not limited thereto.

The red key (third key) is also assigned with an instruction for starting executing the demonstration data while no demonstration is being executed, in the same manner as in the first embodiment.

The input receiving module 201 receives an operation performed on a different key assigned with each of the demonstration blocks from a user. The display processor 6 also displays an operation guide screen for indicating a guide for a key operation on the display 7, in the same manner as in the first embodiment.

If a key operation is received while the executing module 202 is executing the demonstration data, the execution controller 203 moves the execution position in the demonstration data to the position of the block assigned to the key operation.

Figure 9A:
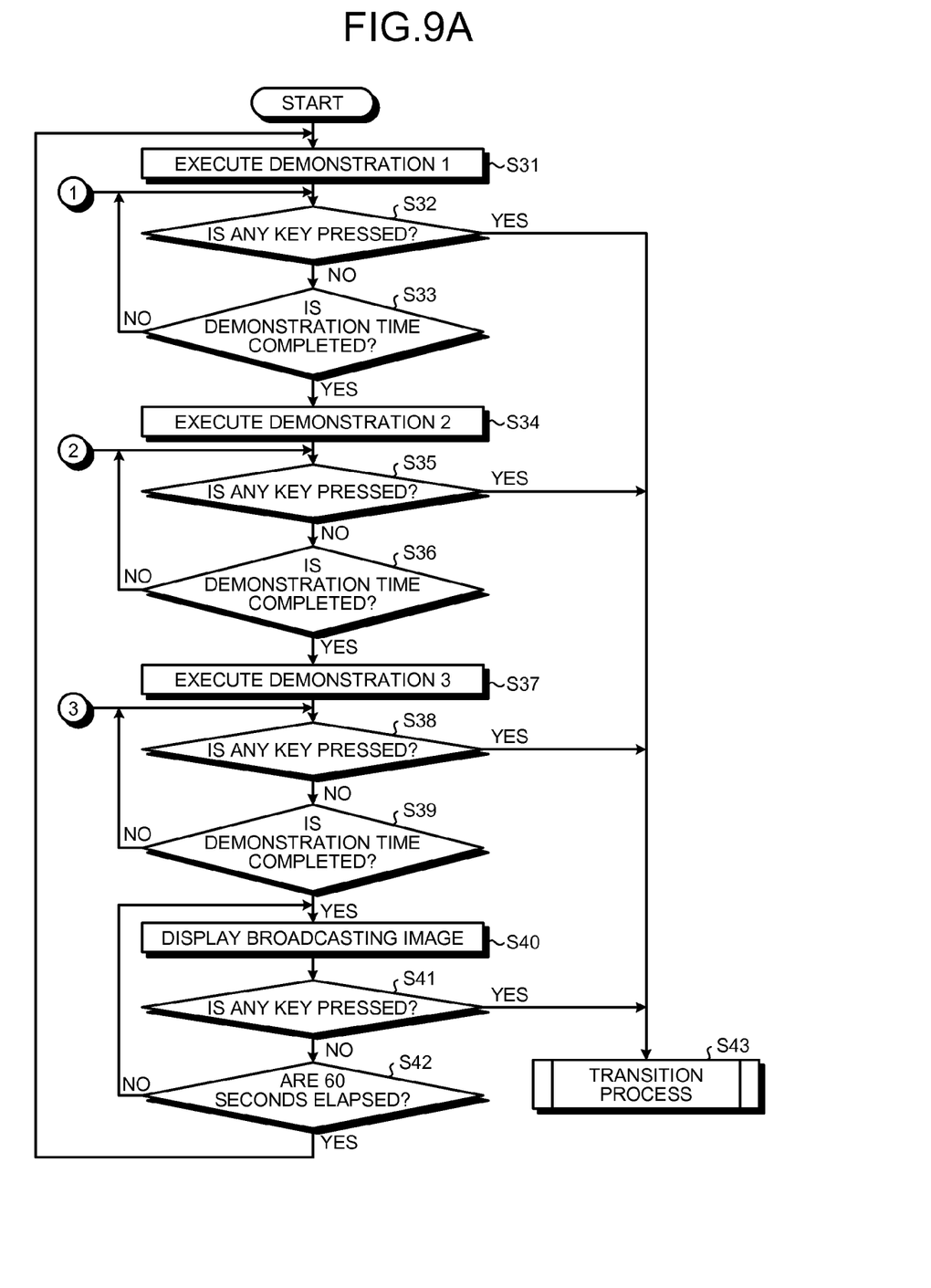
FIG. 9A is an exemplary flowchart of a demonstration execution controlling process according to a second embodiment.
Figure 9B:
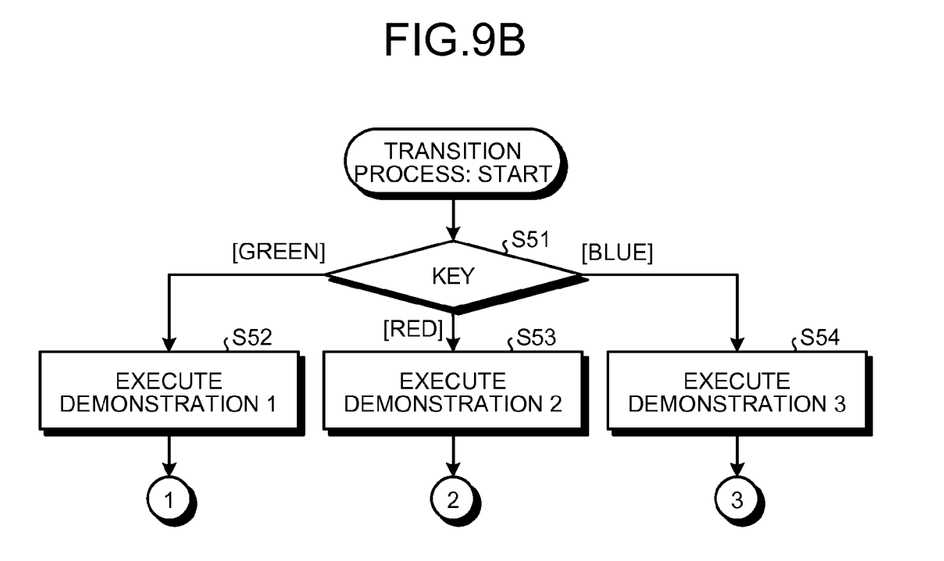
FIG. 9B is an exemplary flowchart of a transition process in the demonstration execution controlling process in the second embodiment.

A demonstration execution controlling process performed by the digital television 100 according to the second embodiment having the configuration described above will now be explained with reference to FIGS. 9A and 9B.

When a user selects the store mode from the mode selection screen that is the same as that according to the first embodiment, and then selects ON for the demonstration function from the store mode screen, the input receiving module 201 receives the selections, and the executing module 202 starts executing the demonstration data from the demonstration 1 (S31).

If the input receiving module 201 receives an input of a pressing operation of a key performed by a user from the remote controller 40 while the demonstration 1 is being executed (Yes at S32), a transition process at S43 is executed. The transition process is a process for executing the demonstration assigned to a pressed key, and will be described later in detail.

If any input of a pressing operation of a key is not received at S32 (No at S32), the executing module 202 determine if the demonstration time of the demonstration 1 is completed (S33). The demonstration time herein means the same thing as the demonstration time according to the first embodiment. Therefore, completion of a demonstration time means that execution of the demonstration in units of blocks is completed.

If the demonstration time of the demonstration 1 is not completed (No at S33), the process proceeds to S32, and further determination if any key is pressed is performed while execution of the demonstration 1 is continued. At S33, if the demonstration time of the demonstration 1 is completed, that is, if the execution of the demonstration 1 is completed (Yes at S33), the executing module 202 executes the demonstration 2, which is the subsequent block (S34).

At S34, if the input receiving module 201 receives an input of a pressing operation of a key performed by a user from the remote controller 40 while the demonstration 2 is being executed (Yes at S35), the process proceeds to the transition process at S43, and the demonstration assigned to the key thus pressed is executed.

If any input of a pressing operation of a key is not received at S35 (No at S35), the executing module 202 determines if the demonstration time of the demonstration 2 is completed, that is, if the execution of the demonstration 2 is completed (S36). If the demonstration time of the demonstration 2 is not completed (if the execution of the demonstration 2 is not completed) (No at S36), the process proceeds to S35, and further determination if any key is pressed is performed while execution of the demonstration 2 is continued. At S36, if the demonstration time of the demonstration 2 is completed (if the execution of the demonstration 2 is completed) (Yes at S36), the executing module 202 executes the demonstration 3, which is the subsequent block (S37).

At S37, if the input receiving module 201 receives an input of a pressing operation of a key performed by a user from the remote controller 40 while the demonstration 3 is being executed (Yes at S38), the process proceeds to the transition process at S43, and the executing module 202 executes the demonstration assigned to the key thus pressed.

If any input of a pressing operation of a key is not received at S38 (No at S38), the executing module 202 determines if the demonstration time of the demonstration 3 is completed, that is, if the execution of the demonstration 3 is completed (S39). If the demonstration time of the demonstration 3 is not completed (if the execution of the demonstration 3 is not completed) (No at S39), the process proceeds to S38, and further determination if any key is pressed is performed while execution of the demonstration 3 is continued. If the demonstration time of the demonstration 3 is completed at S39 (if the execution of the demonstration 3 is completed) (Yes at S39), the display processor 6 displays a broadcasting image on the display 7 for 60 seconds, in the same manner as in the first embodiment (S40).

Figure 10:
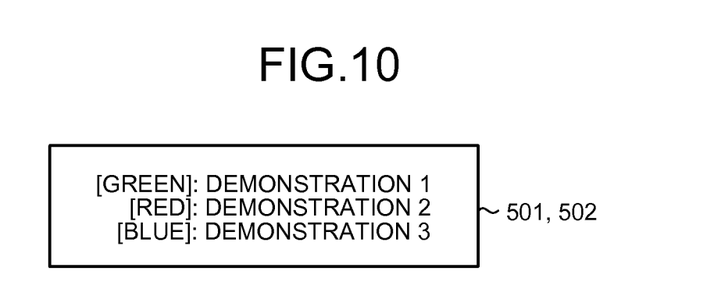
FIG. 10 is an exemplary schematic of an operation guide screen in the second embodiment.

The display processor 6 displays the operation guide screen 501 at the lower right end of the screen on which the demonstration is being performed, and displays the operation guide screen 502 at the lower right end of the screen after the demonstrations are completed. In the second embodiment, the operation guide screen 501 displayed while the demonstration is being executed and the operation guide screen 502 displayed after the demonstrations are completed are the same screen. As illustrated in FIG. 10, displayed in the operation guide screen 501, 502 are the demonstrations caused to be executed correspondingly to the respective keys while the demonstration is executed and after the demonstration is completed.

Referring back to FIG. 9A, if the input receiving module 201 receives an input of a pressing operation of a key performed by a user from the remote controller 40 after the demonstration sequence is completed (Yes at S41), the process proceeds to the transition process at S43, even if 60 seconds are not elapsed after the demonstration is completed, and the demonstration assigned to the key thus pressed is executed.

The transition process performed at S43 will now be explained using FIG. 9B. In the transition process, the execution controller 203 determines if the key for which a pressing operation is received by the input receiving module 201 is the green key, the red key, or the blue key (S51). If the pressed key is the green key (GREEN at S51), the execution controller 203 moves the execution position in the demonstration data to the head of the block of the demonstration 1. The executing module 202 then executes the demonstration 1 (S52). the process proceeds to S32 in FIG. 9A, and the executing module 202 further determines if any key is pressed while continuing executing the demonstration 1.

At S51, if the pressed key is the red key (RED at S51), the execution controller 203 moves the execution position in the demonstration data to the head of the block of the demonstration 2. The executing module 202 then executes the demonstration 2 (S53). The process then proceeds to S35 in FIG. 9A, and further determination if any key is pressed is performed while execution of the demonstration 2 is continued.

At S51, if the pressed key is the blue key (BLUE at S51), the execution controller 203 moves the execution position in the demonstration data to the head of the block of the demonstration 3. The executing module 202 then executes the demonstration 3 (S54). The process then proceeds to S38 in FIG. 9A, and further determination if any key is pressed is performed while execution of the demonstration 3 is continued.

Referring back to FIG. 9A, if a pressing operation on any of the keys is received at S41 (No at S41), the execution controller 203 determines if 60 seconds are elapsed after the demonstrations are completed (S42). If 60 seconds are elapsed (Yes at S42), the execution controller 203 sets the execution position to the head of the first block, returns to S31, and the executing module 202 starts the demonstration data from the head. If 60 seconds are not elapsed yet at S42 (No at S42), the process proceeds to S40.

In the manner described above, in the second embodiment, because the different keys on the remote controller 40 are assigned to the respective demonstration blocks, and a demonstration of the block assigned to the key pressed by a user is executed, the usability of the demonstration in stores and the like can be further improved.

First Modification

Figure 11:
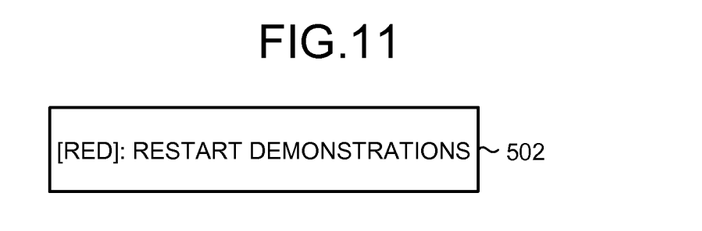
FIG. 11 is an exemplary schematic of an operation guide screen in a first modification.

In the embodiments described above, if a specific key is pressed after the demonstration sequence is completed, the execution controller 203 performs control to start the demonstrations from the beginning, but the embodiment is not limited thereto. For example, the execution controller 203 may be configured to interrupt the execution of the demonstration data in response to a user key operation or the like, and to store the position thus interrupted in a memory or the like. The execution controller 203 may then be configured to move the execution position in the demonstration data to the interrupted position of the demonstration data when the input receiving module 201 receives an input of an operation of a particular key such as the red key while the demonstration data is being interrupted. In the first modification, the operation guide screen 502 will be as illustrated in FIG. 11, as an example.

In this manner, the executing module 202 becomes capable of executing a demonstration from the point at which the execution of the demonstration is interrupted.

Second Modification

Furthermore, the execution controller 203 may also be configured to move the execution position in the demonstration data to the head of the block including the interrupted position in the demonstration data, when the input receiving module 201 receives an input of an operation of a particular key such as the red key while the demonstration data is being interrupted. In this manner, the executing module 202 becomes capable of executing the demonstration from the head of the block that belongs to the same unit as the content having being executed at the time at which the demonstration is interrupted, instead of abruptly restarting the demonstration from the position having been interrupted. In this manner, the usability for the users can be further improved.

Third Modification

In the embodiments described above, the time for restarting the demonstration sequence after the demonstrations is completed is set to 60 seconds. However, 60 seconds is merely an example, and the time may be set to any time.

Furthermore, the execution controller 203 may be configured to control the time for restarting the demonstration data after the completion of the demonstrations to be longer than the execution time of the blocks of demonstration data, or longer than the execution time of a piece of content in a block, e.g., the execution time of each of the pop-up windows 1 to 3 illustrated in FIG. 6, as an example. In this manner, a sufficient time can be ensured until the demonstrations are restarted after completion, so that users are allowed to view the demonstrations more comfortably.

Fourth Modification

In the embodiments described above, two modes, which are the store mode and the home mode, are provided as the modes of the digital television 100, and execution of the demonstration data is started when a user selects the store mode and the demonstration function ON. However, the embodiment is not limited thereto. For example, as a mode for the digital television 100, a demonstration mode may be provided in addition to the store mode and the home mode, and the demonstrations may be executed when a user selects the demonstration mode in the mode selection screen.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device for controlling execution of demonstration data, the electronic device comprising:
    an executing module configured to execute the demonstration data, the demonstration data divided into a plurality of blocks;
    an input receiving module configured to receive an input of one of a plurality of predetermined buttons from a user;
    an execution controller configured to move, while a first block of the plurality of blocks of the demonstration data is being executed, an execution position in the demonstration data from a current position in the first block of the plurality of blocks of the demonstration data to:
    a beginning of the first block of the plurality of blocks of the demonstration data when a first input of a first predetermined button of the plurality of predetermined buttons is received;
    a beginning of a second block of the plurality of blocks of the demonstration data when a second input of a second predetermined button of the plurality of predetermined buttons is received, and
    a beginning of a third block of the plurality of blocks of the demonstration data when a third input of a third predetermined button of the plurality of predetermined buttons is received ; and
    a display processor configured to display content of the execution of the demonstration data on a display,
    wherein the executing module is configured to start the execution of the demonstration data from the beginning of the second block of the plurality of blocks of the demonstration data when the second input is received and start the execution of the demonstration data from the beginning of the third block of the plurality of blocks of the demonstration data when the third input is received.

2. The electronic device of claim 1, wherein
    the input receiving module is configured to receive the first input of the first predetermined button indicating an instruction for moving the execution position in the demonstration data in a forward direction, and the second input of the second predetermined button indicating an instruction for moving the execution position in the demonstration data in a backward direction.

3. The electronic device of claim 1, wherein
    the input receiving module is configured to receive a plurality of inputs, each input of the plurality of inputs being assigned to a separate block of the plurality of blocks of the demonstration data, and
    the execution controller is configured to move the execution position in the demonstration data to a beginning of one of the blocks of the plurality of blocks of the demonstration data assigned to a received input of the plurality of inputs when the plurality of inputs is received while the demonstration data is being executed.

4. The electronic device of claim 1, wherein
    the input receiving module is configured to receive an input of a fourth predetermined button of the plurality of predetermined buttons indicating an instruction to start executing the demonstration data, and
    the execution controller is configured to control the executing module to start executing the demonstration data when the fourth predetermined button of the plurality of predetermined buttons is received while the demonstration data is not being executed.

5. The electronic device of claim 4, wherein the execution controller is configured to move the execution position in the demonstration data to a beginning of a block of the plurality of blocks of the demonstration data that was executed first when a fourth predetermined button of the plurality of predetermined buttons is received after execution of the demonstration data is completed.

6. The electronic device of claim 4, wherein the execution controller is configured to move the execution position in the demonstration data to a position in the first block of the plurality of blocks of the demonstration data of the execution position when the fourth input of a fourth predetermined button of the plurality of buttons is received.

7. The electronic device of claim 4, wherein the execution controller is configured to move the execution position in the demonstration data to a beginning of one of the blocks of the plurality of blocks of the demonstration data that includes a position at which the demonstration data is interrupted when the fourth input of a fourth predetermined button of the plurality of buttons is received.

8. The electronic device of claim 1, wherein the display processor is configured to display operation guide information indicating a guide for the plurality of the predetermined buttons on the display.

9. The electronic device of claim 1, wherein the execution controller is configured to control a time for starting the demonstration data after completion to be longer than an execution time of the plurality of blocks of the demonstration data, or longer than an execution time of content in the plurality of blocks of the demonstration data.

10. The electronic device of claim 1, wherein the display is placed in a first mode comprising a brightness setting set to high and a power saving function set to off, the power saving function allowing power to the display to be turned off when no operation is performed on the display over a predetermined time period.

11. A method for controlling execution of demonstration data, the method comprising:
    executing the demonstration data, the demonstration data being divided into a plurality of blocks;
    receiving an input of one of a plurality of predetermined buttons from a user;
    moving, while a first block of the plurality of blocks of the demonstration data is being executed, an execution position from a current position in the first block of the plurality of blocks of the demonstration data to:
    a beginning of the first block of the plurality of blocks of the demonstration data when a first input of a first predetermined button of the plurality of predetermined buttons is received;
    a beginning of a second block of the plurality of blocks of the demonstration data when a second input of a second predetermined button of the plurality of predetermined buttons is received, and
    a beginning of a third block of the plurality of blocks of the demonstration data when a third input of a third predetermined button of the plurality of predetermined buttons is received;
    displaying content of the execution of the demonstration data; and
    starting the execution of the demonstration data from the beginning of the second block of the plurality of blocks of the demonstration data when the second input is received and start the execution of the demonstration data from the beginning of the third block of the plurality of blocks of the demonstration data when the third input is received.

12. The method of claim 11 further comprising:
placing a display in a first mode comprising a brightness setting set to high and a power saving function set to off, the power saving function allowing power to the display to be turned off when no operation is performed on the display over a predetermined time period.

* * * * *